(12) United States Patent
Barthel et al.

(10) Patent No.: US 10,599,103 B2
(45) Date of Patent: Mar. 24, 2020

(54) SAFETY-ORIENTED AUTOMATION SYSTEM

(71) Applicant: Siemens Aktiengesellschaft, Munich (DE)

(72) Inventors: Herbert Barthel, Herzogenaurach (DE); Maximilian Walter, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 113 days.

(21) Appl. No.: 15/948,658

(22) Filed: Apr. 9, 2018

(65) Prior Publication Data

US 2018/0290251 A1   Oct. 11, 2018

(30) Foreign Application Priority Data

Apr. 10, 2017 (EP) .................................... 17165751

(51) Int. Cl.
*G05B 9/02*         (2006.01)
*G05B 19/418*       (2006.01)
*B25J 9/00*         (2006.01)
*B25J 9/16*         (2006.01)

(52) U.S. Cl.
CPC .............. *G05B 9/02* (2013.01); *B25J 9/0084* (2013.01); *B25J 9/1674* (2013.01); *G05B 19/41855* (2013.01); *Y02P 90/185* (2015.11)

(58) Field of Classification Search
CPC ........ B25J 9/0084; B25J 9/1674; G05B 7/00; G05B 7/02; G05B 9/00–9/03
USPC .............. 700/19, 21, 79, 245, 247–249, 255
See application file for complete search history.

(56) References Cited

U.S. PATENT DOCUMENTS

| | | | |
|---|---|---|---|
| 6,687,551 B2* | 2/2004 | Steindl | H04L 12/40032 700/1 |
| 6,704,819 B1 | 3/2004 | Chrysanthakopoulos | |
| 2002/0007422 A1* | 1/2002 | Bennett | H04L 41/0213 709/246 |
| 2009/0105849 A1 | 4/2009 | Glanzer et al. | |

FOREIGN PATENT DOCUMENTS

| | | |
|---|---|---|
| DE | 102013003166 | 8/2014 |
| WO | WO98/017033 | 4/1998 |

OTHER PUBLICATIONS

Neamatollahi Peyman et al., "A simple token-based algorithm for the mutual exclusion problem in distributed systems", Journal of Supercomputing, Kluwer Academic Publishers, Dordrecht, NL, vol. 73, No. 9, pp. 3861-3878, 2017.
Weis Olga, "How to share serial port over network", Serial over network—share COM port software and hardware guide, p. 3, 2015.

* cited by examiner

*Primary Examiner* — Joseph R Kudirka
(74) *Attorney, Agent, or Firm* — Cozen O'Connor

(57) ABSTRACT

An automation system includes a fieldbus, at least two automation devices which are securely connected to the fieldbus, at least two coupling points which are configured such that automated connection and disconnection of an exchanging device to and from the fieldbus is possible, wherein exchanging devices are configured to establish a functionally safe connection with the automation devices via the fieldbus, where the functional safety thus achieved serves to avoid malfunctions as a result of errors.

4 Claims, 2 Drawing Sheets

SAFETY-ORIENTED AUTOMATION SYSTEM

BACKGROUND OF THE INVENTION

1. Field of the Invention

The invention relates to an automation system comprising a fieldbus, and at least two automation devices that are securely connected to the fieldbus, at least two coupling points which are configured such that the automated connection and disconnection of an exchanging device to and from the fieldbus is possible, where the exchanging devices are configured to establish a functionally safe connection with the automation devices by way of the fieldbus, and where the achieved functional safety serves to avoid hazardous malfunctions caused by errors.

In the sense of the invention, functional safety means the safety for a part of the system that depends on the accurate functioning of the safety-related systems and external facilities for risk reduction. Functional safety exists when each risk is safeguarded by way of safety functions such that the machine can be designated as safe.

2. Description of the Related Art

Functional safety is required, for example, in a tool changer. For example, a plurality of robots operate in a manufacturing cell and alternately operate with a plurality of tools (e.g. welding tongs). When a robot picks up a tool, a safe connection is established between the tool and the control system that controls the robot. Rarely used tools are shared by the robots and can therefore be used alternately on different robots. A safe communication link to the tool may only be established to control the robot that is also currently using the tool. A physical separation is out of the question because the control systems of the robots must be able to communicate with each other. In this case, flanges of the robots constitute the coupling points.

Functional safety is also required for clamping frames. Clamping frames migrate from station to station. There is a slot at each station. There are devices that communicate with each other on the clamping frame and at the stations. There is also communication between the stations. Consequently, safe connections should only be established between the devices of the clamping frame and the devices of the current station.

DE 10 2013 003 166 A1 discloses a safety module for a fieldbus subscriber and an automation system. Here, provision is made to arrange an adjustment device in a housing of a safety module to determine a safety-oriented identification address. In this adjustment device, for example, a DIL switch, a unique identification address is configured.

SUMMARY OF THE INVENTION

It is the object of the present invention to provide an automation system with a slot-dependent structure of functional safe fieldbus connections, while simultaneously omitting an adjustment device, such as a DIL switch.

This and other objects and advantages are achieved in accordance with the invention by an automation system in which the automation devices are configured to gain exclusive access to one exchanging device via a safety program and, upon receiving access authorization, to initiate and control the connection of the exchanging device to a coupling point. The automation devices are furthermore configured to establish a functionally safe connection with the exchanging device after connection and to exchange data with the exchanging device and/or to send commands to the exchanging device. In addition, the automation devices are further configured to disconnect the functionally safe connection with the currently connected exchanging device and to initiate and control the disconnection of the exchanging device from the coupling point, where the safety program is furthermore configured to re-enable exclusive access to the exchanging device.

The solution is based on the assumption that the automation devices are assigned to a fixed slot and are not changed. The automation devices can, for example, be control systems of robots. Furthermore, it is assumed that the connection and disconnection of the exchanging devices is controlled by the fixed devices. In the example of the robots, this means that the robots are responsible for picking up a tool and/or their automation devices have a program mechanism for connection and disconnection at their disposal. Within the automation device and/or within the associated safety program, the following steps are performed:

1. The automation device gains exclusive access to the exchanging device. This occurs in a functionally safe manner within the safety program.
2. The automation device initiates the connection of the exchanging device at the desired slot. A corresponding instruction is sent from the safety program to a standard program for this purpose (e.g., "Pick up tool").
3. The automation device establishes a safe connection with the exchanging device. After the robot has completed its tasks and would like to put down the tool again, a connection is terminated.
4. The safe connection is disconnected.
5. The automation device brings about a disconnection of the exchanging device.
6. Exclusive access to the exchanging device is enabled once again.

There are various options regarding the implementation of "exclusive access to the exchanging device", of which two principal alternatives are listed here.

In a first alternative embodiment, the automation system has a virtual ring that connects the automation devices, where the automation devices are configured to exchange a token assigned to each of the exchanging devices by way of the virtual ring. Furthermore, the automation devices are configured to gain exclusive access to an exchanging device, to wait for the token assigned to the exchanging device and to retain the token for the duration of the exclusive access and to forward the tokens which are not required.

This would correspond to a distributed solution: A token is exchanged cyclically between the automation devices in a virtual ring for each exchanging device. To gain exclusive access, the corresponding automation device must wait for the corresponding token. The token is only forwarded again after release of the exchanging device.

In a second alternative embodiment, the automation devices are configured such that a particular automation device is assigned to each exchanging device as a master. In this case, the individual automation device is furthermore configured such that access requests from other automation devices are managed on the exchanging device assigned to this automation device. This solution corresponds to a centralized implementation: Each exchanging device is managed by a particular fixed device (master) that is known to the other fixed devices. The other fixed devices must request access to the exchanging device from the master. The master guarantees that an exchanging device is only assigned to one fixed device at a time in each case, and manages the other requests, e.g., in a waiting line.

With regard to a tool changer in a manufacturing cell for a plurality of cooperating robots, it is advantageous that the automation devices are assigned to a handling and or processing system, and that the exchanging devices comprise an exchangeable tool and a fieldbus subscriber which is configured to control actuators on the tool.

Even if the aforementioned automation system and the method for implementation is partially based on mechanisms which, taken individually, are not implemented in a functionally safe manner, overall the automation system and/or its implementation method is functionally safe.

Justification:
1. Error scenario: As a result of an error, an automation device with its associated safety program in Step 2 does not connect to an exchanging device, but then in Step 3 no connection can be established either.
2. Error scenario: As a result of an error, the "fixed" automation device is connected to the wrong exchanging device in Step 2, then the establishment of the safe connection according to Step 3 would fail as all the devices and/or fieldbus subscribers have a safe "authenticity code" at their disposal.
3. Error scenario: As a result of an error, a fixed automation device connects to an exchanging device without a request from the safety program having been provided for this purpose (Step 1 not executed). A safe connection is therefore not established as Step 3 can only be executed after Step 1.
4. Error scenario: Another fixed automation device has already erroneously connected to the exchanging device. In this case, Step 2 would fail.

In sum, it can be said that an automation system and a method was shown in which a slot-dependent structure of functionally safe fieldbus connections was realized in software via mutual exclusion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment is explained in more detail with reference to the diagram, in which.

DETAILED DESCRIPTION OF THE EXEMPLARY EMBODIMENTS

Figure 1:
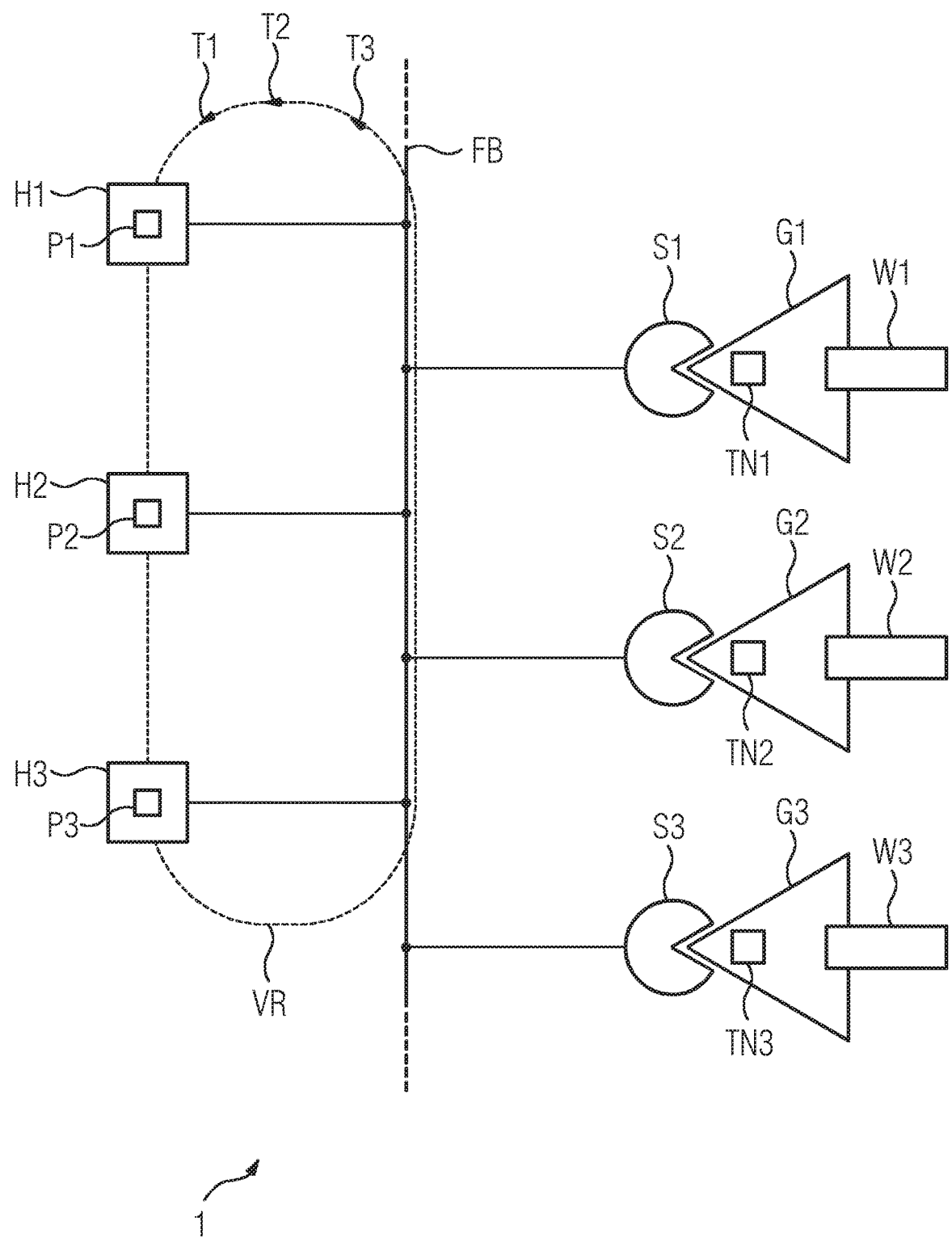
FIG. 1 shows a schematic illustration of a functionally safety-oriented automation system in accordance with the invention.

FIG. 1 shows an automation system 1 configured for functional safety. The automation system 1 comprises a fieldbus FB, a first automation device H1, a second automation device H2 and a third automation device H3 which are connected to the fieldbus FB. The automation devices H1, H2, H3 are securely connected to the fieldbus and therefore have a dedicated slot. Furthermore, a first exchanging device G1, a second exchanging device G2 and a third exchanging device G3 can be connected to the fieldbus FB. A first coupling point S1, a second coupling point S2 and a third coupling point S3 are connected to the fieldbus FB for this purpose. An exchanging device G1, G2, G3 can be connected to any coupling point S1, S2, S3. After successful connection, an electrical connection to the exchanging device G1, G2, G3 is established. A communication connection to the exchanging devices G1, G2, G3 is also established after connection to a coupling point S1, S2, S3 by way of a first fieldbus subscriber TN1 or second fieldbus subscriber TN2 or third fieldbus subscriber TN3 in the exchanging devices G1, G2, G3. In the case of a connected exchanging device G1, G2, G3 to a coupling point S1, S2, S3, the automation devices H1, H2, H3 can thus communicate with the exchanging devices G1, G2, G3 by way of the fieldbus FB.

In order to now arrive at a slot-dependent structure of functionally secure fieldbus connection, the exchanging devices G1, G2, G3 are configured to establish a functionally safe connection with the automation devices H1, H2, H3 by way of the fieldbus FB, where the functional safety achieved thereby serves to avoid hazardous malfunctions caused by errors. The automation devices H1, H2, H3 are configured such that exclusive access can be gained to one of the exchanging devices G1, G2, G3 via a safety program P1, P2, P3. After receiving access authorization, the automation devices H1, H2, H3 are configured to initiate and control the connection of an exchanging device G1, G2, G3 to a coupling point S1, S2, S3. After connection, a functionally safe connection to the currently connected exchanging device G1, G2, G3 is established. Now, for example, a robot (cf. FIG. 2) can complete its tasks with the currently connected exchanging device G1, G2, G3. After completion of its tasks, the robot can put down the tool W1, W2, W3 and/or the exchanging device G1, G2, G3 again. For this purpose, the functionally safe connection to the currently connected exchanging device G1, G2, G3 is disconnected and the disconnection of the exchanging device G1, G2, G3 from the coupling point S1, S2, S3 is initiated and controlled. In doing so, the safety program P1, P2, P3 is further configured to re-enable exclusive access to the exchanging device G1, G2, G3.

The automation system 1 and/or the automation devices H1, H2, H3 is preferably assigned to a handling and/or processing system. For this purpose, the exchanging devices G1, G2, G3 have an exchangeable tool W1, W2, W3 and a fieldbus subscriber TN1, TN2, TN3.

There is an option with a cyclically circulating token for the automation devices H1, H2, H3 regarding a software implementation of "exclusive access to the exchanging device". For this purpose, first token T1 is assigned to the first exchanging device G1, a second token T2 to the second exchanging device G2 and a third token T3 to the third exchanging device G3. The tokens T1, T2, T3 circulate cyclically between the automation devices H1, H2, H3 in a virtual ring VR. In terms of communication technology, the automation devices H1, H2, H3 are configured to exchange the tokens T1, T2, T3 assigned to the exchanging devices G1, G2, G3 among each other. If an automation device H1, H2, H3 seeks to gain exclusive access to an exchanging device G1, G2, G3, that automation device waits for the corresponding token T1, T2, T3 and retains the token for the duration of the desired exclusive access to the corresponding exchanging device G1, G2, G3. The tokens T1, T2, T3 currently not required are cyclically forwarded in the virtual ring VR.

In another embodiment of an implementation, the automation devices H1, H2, H3 are configured such that a particular automation device H1, H2, H3 is assigned to each exchanging device G1, G2, G3 as a master and, in doing so, the individual automation device H1, H2, H3 is further configured to manage the access requests of other automation devices H1, H2, H3 on the exchanging device G1, G2, G3 assigned to this automation device H1, H2, H3.

Figure 2:
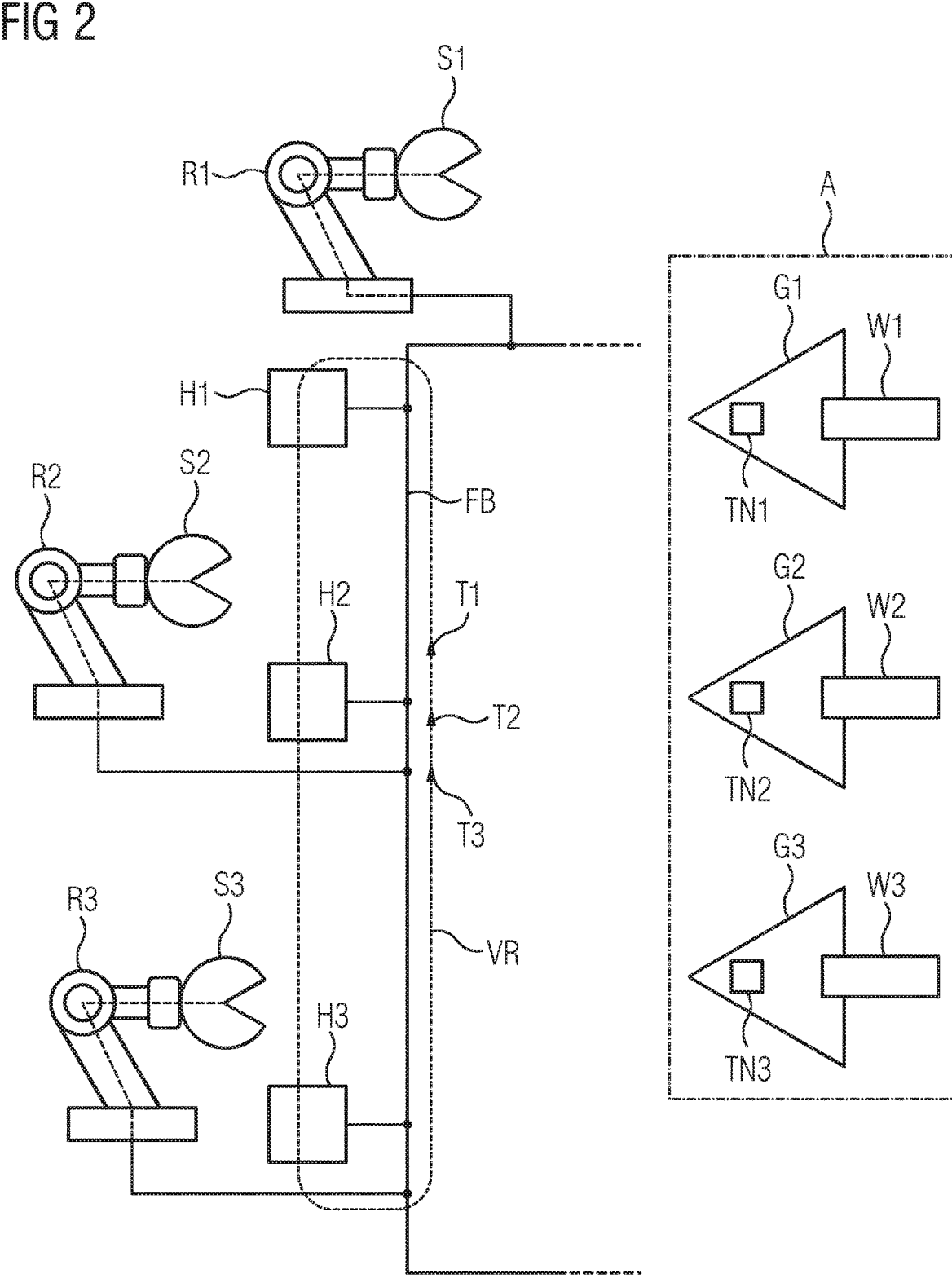
FIG. 2 shows a schematic illustration of the functionally safety-oriented automation system in conjunction with a handling and/or processing system in accordance with the invention.

The automation system 1 shown in FIG. 1 is used advantageously in accordance with FIG. 2 in a handling and/or processing system. As an example of a handling and/or processing system, here a first processing system R1, a second processing system R2 and a third processing system R3 are each used in the form of a robot. In order for the first processing system R1 to be controlled, it is securely connected to the associated first automation device H1. The second processing system R2 is securely connected to the second automation device H2 and the third processing system R3 is securely connected to the third automation device H3.

The processing systems R1, R2, R3 can collect the exchanging devices G1, G2, G3 already known from FIG. 1 from a storage location A. For this purpose, the processing systems R1, R2, R3 have the first coupling point S1, the second coupling point S2 and/or the third coupling point S3 in their robot head, for example. A fieldbus cable, which is likewise connected to the fieldbus FB, is routed into the coupling points S1, S2, S3. In the processing systems R1, R2, R3, the fieldbus cable is shown as a dashed line as far as the coupling point S1, S2, S3. If, for example, the first automation device H1 now initiates the coupling of the first exchanging device G1, the first processing system R1 will reach into the storage location A and pick up the first exchanging device G1 with its first tool W1. By reaching, the exchanging device G1 is successfully connected to the first coupling point S1 and the first fieldbus subscriber TA1 can be connected to the fieldbus FB by way of the coupling point S1 and the first automation device H1 establishes a functionally safe connection with the first fieldbus subscriber TN1.

Analogously to the aforementioned, any desired functionally safe connections of the automation devices H1, H2, H3 can be established to the corresponding fieldbus subscribers T1, T2, T3 according to the indicated functionally safe regulation.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automation system comprising:
   a fieldbus;
   at least two automation devices which are securely connected to the fieldbus; and
   at least two coupling points configured to provide automated connection and disconnection of an exchanging device of a plurality of exchanging devices to and from the fieldbus, the plurality of exchanging devices being configured to establish a functionally safe connection with the at least two automation devices via the fieldbus, functional safety thus achieved serving to avoid malfunctions caused by errors;
   wherein the at least two automation devices are configured to gain exclusive access to the exchanging device of the plurality of exchanging devices via a safety program and configured to initiate and control a particular connection of the exchanging device of the plurality of exchanging devices to a coupling point after obtaining access authorization, the at least two automation devices being further configured to establish a functionally safe connection to the exchanging device of the plurality of exchanging devices after the particular connection and configured to send commands to the exchanging device of the plurality of exchanging devices, the at least two automation devices being further configured to disconnect the functionally safe connection to a currently connected exchanging device of the plurality of exchanging devices and to initiate and control disconnection of the exchanging device of the plurality of exchanging devices from the coupling point; and
   wherein the safety program is further configured to re-enable the exclusive access to the exchanging device of the plurality of exchanging devices.

2. The automation system as claimed in claim 1, further comprising:
   a virtual ring which interconnects the at least two automation devices,
   wherein the at least two automation devices are further configured to exchange a token assigned to each of the exchanging devices of the plurality of exchanging devices via the virtual ring, and the at least two automation devices being further configured to gain exclusive access to the exchanging device of the plurality of exchanging devices, to wait for a particular token assigned to the exchanging device of the plurality of exchanging devices, to retain the particular token for a duration of the exclusive access and to forward tokens which are not required.

3. The automation system as claimed in claim 1, wherein the at least two automation devices are configured such that a particular automation device of the at least two automation devices is assigned to each exchanging device of the plurality of exchanging devices as a master, an individual automation device being further configured such that access requests from other automation devices of the at least two automation devices are managed on the exchanging device of the plurality of exchanging devices assigned to the individual automation device.

4. The automation system as claimed in claim 1, wherein the at least two automation devices are assigned to at least one of (i) a handling system and (ii) a processing system; and wherein the exchanging devices of the plurality of exchanging devices comprise an exchangeable tool and a fieldbus subscriber which is configured to control actuators on the exchangeable tool.

\* \* \* \* \*